H. VAN ALTENA.
CHROMATROPE TOY.

No. 194,628. Patented Aug. 28, 1877.

WITNESSES:
A. H. Schattenberg
B. Smith

INVENTOR:
Henry Van Altena
By Jas. B. Erwin
Attorney

UNITED STATES PATENT OFFICE.

HENRY VAN ALTENA, OF MILWAUKEE, WISCONSIN.

IMPROVEMENT IN CHROMATROPE TOYS.

Specification forming part of Letters Patent No. 194,628, dated August 28, 1877; application filed April 24, 1877.

*To all whom it may concern:*

Be it known that I, HENRY VAN ALTENA, of the city of Milwaukee, in the county of Milwaukee and State of Wisconsin, have invented certain new and useful Improvements in Chromatrope Toys; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
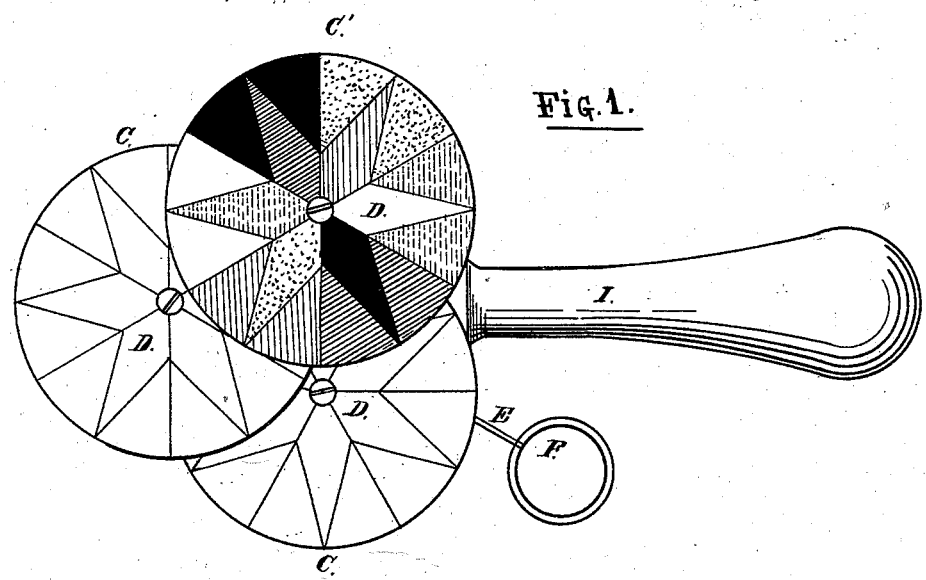
Figure 2:
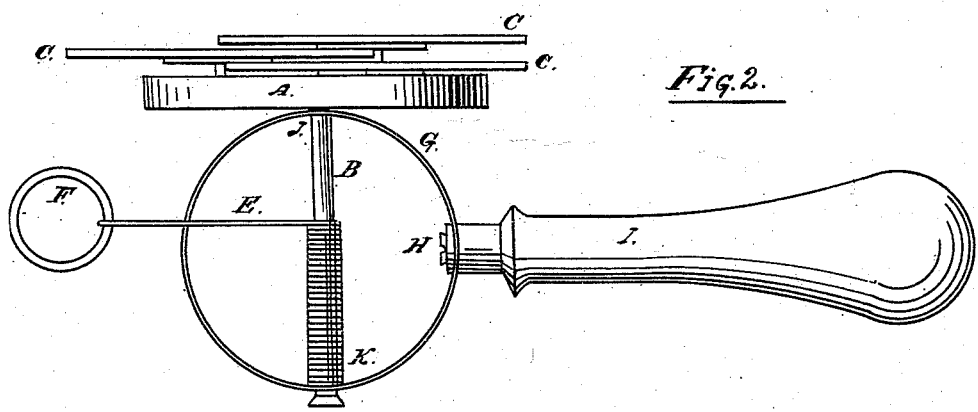
Figure 3:
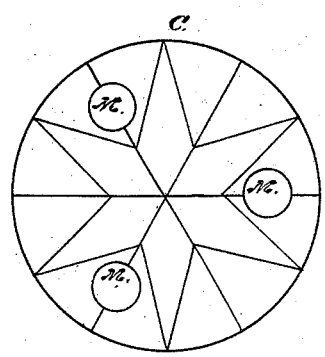

Figure 1 of the accompanying drawings represents a front view of my invention. Fig. 2 represents a side view of the same. Fig. 3 represents a sectional view, having openings $m$, showing one means by which the effect, when the device is operated, may be varied.

My invention relates to improvements in chromatrope toys, the operation of which is partly manual and partly automatic, my object being to furnish a toy for the amusement of children, which, when operated, presents a beautiful appearance to the eye, which is varied infinitely, and is, by an automatic movement, constantly changing in color, shade, and form, closely resembling in appearance those of the kaleidoscope, and is thereby calculated to fascinate and prolong the interest of children, satisfying their natural desire for change.

The invention consists in the construction and arrangement, herein described, of a disk, A, secured to the axle B, with which it revolves. The disk A is made of wood or other suitable material, of sufficient weight to retain the momentum given it through many revolutions. The disks C are made of cardboard or its equivalent. They are attached to the disk A at equal distances from the center of the disk by screws D, at or near its periphery, and rotate around its center as it revolves. The disks C are caused to revolve by the friction of the atmosphere inserted at starting, or by any change of their equilibrium. As the disk A, to which they are attached, is set in motion the revolving movement of the disks C changes constantly the relative position of the figures upon them, and thus the great varieties of appearances above referred to are produced as they are rapidly rotated around their common center with and upon the disk A.

The figures upon the disks C, and the arrangement and shade of their colors, may be varied to suit the taste. It is usual, however, to make the figures upon each of them correspond. The upper disk C is shaded to represent the order or arrangement of the different colors, each of which should be bright and definite, the primary colors being preferred. Also, the form of the star, as shown, as the effect produced by this peculiar form when the disks are in rapid motion is greatly varied and pleasing to the eye.

The number of disks C may be increased or diminished, as desired.

One or more openings may be made through the disk C, as shown in Fig. 3, which also changes the effect produced.

There is a cord, E, attached to the axle B, by which it is given a continuous rotary motion, alternating in opposite directions as the cord is drawn out and released by the operator, alternately winding and unwinding upon the axle. There is a ring, F, attached to the cord E, by which it is held and operated.

The ring G is made of hoop-iron or its equivalent, the ends of which, when united to form the ring, are secured together by the screw H against the end of the handle I. There are holes J and K in the ring G, which form the journals to the axle B.

I am aware that toys consisting of particolored disks, arranged to revolve by means of a shaft, substantially in the manner as herein described, have before been known and used, and I do not, therefore, wish to be understood as claiming such as my invention, broadly.

What I claim is—

The disk A, axle B, disks C eccentric to the disk A, ring G, cord E, and handle I, constructed and arranged to operate substantially as and for the purpose specified.

In testimony that I claim the foregoing as my own I affix my signature in presence of two witnesses.

H. VAN ALTENA.

Witnesses:
ADOLPH MEINECKE,
K. SHAWVAN.